R. G. CLARK.
SOAP DISPENSING MACHINE.
APPLICATION FILED APR. 20, 1906.
948,721.
Patented Feb. 8, 1910.
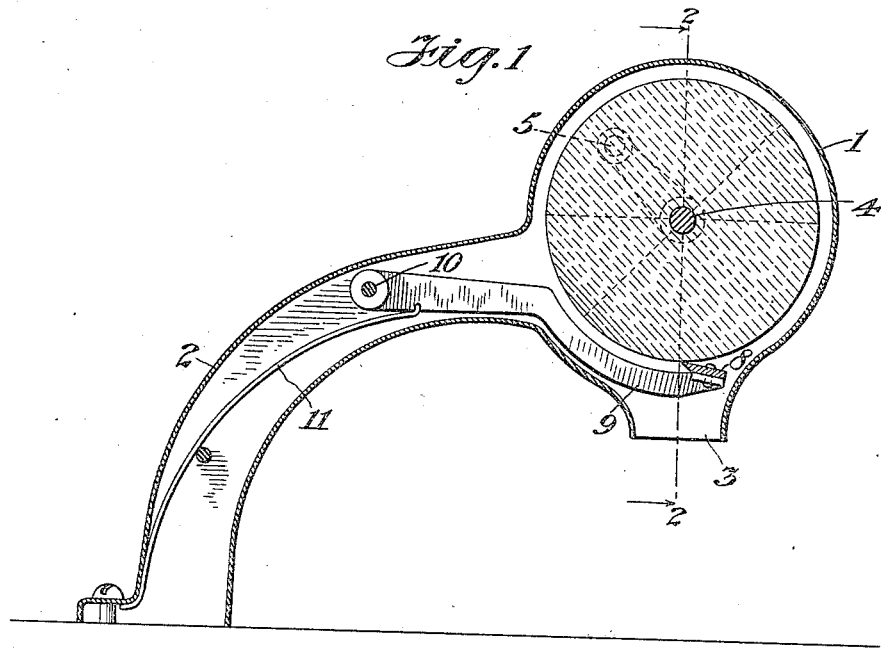
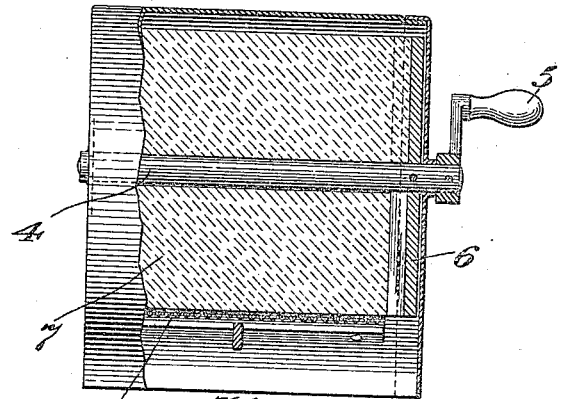
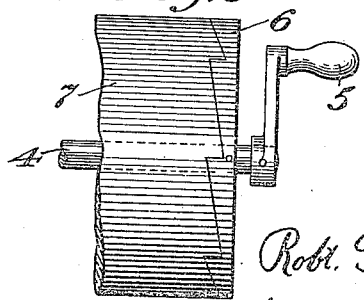
Witnesses
Chas. F. Clagett
Wm. Arthur Babson
Robt. G. Clark, Inventor
By his Attorney Lewis J. Doolittle

UNITED STATES PATENT OFFICE.

ROBERT G. CLARK, OF BROOKLYN, NEW YORK, ASSIGNOR TO HYGIENIC SOAP GRANULATOR COMPANY, A CORPORATION OF NEW JERSEY.

SOAP-DISPENSING MACHINE.

948,721.   Specification of Letters Patent.   Patented Feb. 8, 1910.

Application filed April 20, 1906. Serial No. 312,741.

*To all whom it may concern:*

Be it known that I, ROBERT G. CLARK, a citizen of the United States, and resident of Brooklyn, in the county of Kings and State of New York, have invented certain new and useful Improvements in Soap-Dispensing Machines, of which the following is a specification.

This invention relates to soap dispensing machines designed for use as toilet fixtures for the purpose of supplying soap from the bar or cake in such a form that it may be readily and economically used and do away with the use of a cake of soap in the hand in the ordinary manner.

It is well known that the indiscriminate use of soap, especially in places partaking of a public character, is extremely undesirable by reason of the contamination of the cake of soap when used in the ordinary manner. It is also known that more soap is dissolved than necessary when a cake is so used, resulting in considerable waste.

The object of this invention is to eliminate the above and other objections to the use of soap in the ordinary manner and to provide a machine of simple and compact construction which will dispense the soap in such a form that it is readily reduced to lather, resulting in a saving in the amount of soap used on account of the fact that the cake is not brought into contact with water or the hands of the users, but only a sufficient quantity is delivered from the machine in a comminuted form.

In the device shown in the accompanying drawings, illustrating one embodiment of my invention, a comminuting device is arranged to operate peripherally upon a cake of soap. The details of the construction of this device illustrating several of the more important features of my invention will be fully described in connection with the drawings.

In the several views of the drawings the same parts have been given similar reference numbers.

Figure 1 is a sectional side elevation of a device embodying my invention. Fig. 2 is a sectional view taken on the line 2—2 of Fig. 1. Fig. 3 is a view of a portion of the device showing means for supporting and rotating a cake of soap.

At 1 is shown a container, preferably cylindrical in form and having a projection 2 at one side thereof forming a standard of support by means of which the machine may be secured in place. At the lower side of the container 1 is provided an opening 2, extending lengthwise of the same and through which the particles of soap fall into the hand of the operator.

A shaft 4 is provided with a suitable hand lever 5 for rotating the same. This shaft extends horizontally through the central portion of the container 1, and is provided with suitable bearings at either end thereof. Secured to this shaft at one end of the container is a flange 6 which is provided with one or more projections adapted to engage corresponding projections on the cake of soap 7. This cake of soap is preferably cylindrical in form and provided with a central opening through which the shaft 4 extends and supports the same in position in the container.

The comminuting device is preferably in the form of a cutter provided with an irregular or serrated cutting edge. This cutter may be carried upon a supporting arm 9, pivoted at 10 to the container. A spring, such as 11, may be provided to press against this supporting arm 9 and so cause the cutter to operate against the cylindrical surface or periphery of the cake of soap as the same is rotated with the shaft 4 by means of the engaging flange 6 above described.

It will be seen that the cutter will gradually work inwardly as the soap is cut away and will operate upon the cake of soap in planes concentric with the center thereof. The serrated cutting edge will cut spiral shavings from the cake of soap which will fall through the opening 3 in the container into the hand of the operator, and on account of the location of this opening at the lower side of the container and the position of the cutter directly over said opening, the accumulation of shavings in other parts of the container will thus be prevented.

One end of the container may be removable, as shown in the drawing, to provide access to the interior of the device to renew the soap. The operating handle and shaft may be so constructed as to be removable with the cover or removable portion of the container if desired.

It will be noted that this machine is composed of a very small number of working parts which renders it so much less liable to get out of repair and also provides a very simple and cheap construction accomplishing the desired purpose in a very simple and efficient manner.

The whole device is self-contained and none of the working parts are exposed, consequently reducing the liability of damage and, furthermore, on account of the compact construction provides a machine which takes up very little space, which is an important feature in a device of this nature.

What I claim is:

1. In a soap dispensing machine, the combination with a casing, of a rotative shaft mounted within said casing, engaging members carried by said shaft adapted to engage the outer face only of one end of a cake of soap to cause said soap to rotate with said shaft, a shaving knife located over an opening in the lower portion of said casing, said casing having a hollow supporting arm, a lever in said arm for carrying the shaving knife, and a spring arranged in said arm to engage said lever and force said knife against the cake of soap.

2. In a device of the character described, the combination with a casing comprising a cylindrical body portion and a hollow base portion, said body portion having an opening formed in the bottom thereof, of a shaft rotatively mounted in said casing, means for rotating said shaft from the exterior of the casing, means carried by said shaft adapted to engage a cake of soap, a lever pivoted in the hollow base and projecting into the body portion, means normally tending to force one end of said lever toward said shaft, and a soap comminuting device mounted upon said lever.

3. In a device of the character described, the combination with a horizontally disposed casing, of a soap receiving shaft rotatably mounted in said casing, means carried by said shaft adapted to engage one end of said soap to cause said soap to rotate with said shaft, there being an elongated opening formed in said casing beneath said shaft, a soap comminuting device located between said shaft and said opening, said casing having a hollow supporting base portion, a lever in said base portion carrying said comminuting device, and a spring in the hollow base portion arranged to force said comminuting means against said cake of soap.

Signed at Brooklyn in the county of Kings and State of New York this 16th day of April A. D. 1906.

ROBERT G. CLARK.

Witnesses:
 LEWIS J. DOOLITTLE,
 J. WADSWORTH NORTON.